(12) United States Patent
Benya et al.

(10) Patent No.: US 8,373,547 B2
(45) Date of Patent: Feb. 12, 2013

(54) METHOD AND APPARATUS FOR USING POWER-LINE PHASE-CUT SIGNALING TO CHANGE ENERGY USAGE

(75) Inventors: James R. Benya, West Linn, OR (US); Joel W. Snook, Grass Valley, CA (US); Erik R. Page, Winters, CA (US); Michael Siminovitch, Woodland, CA (US); Konstantinos Papamichael, El Macero, CA (US); Don Aumann, Davis, CA (US); Margaret Aumann, legal representative, Davis, CA (US)

(73) Assignees: Nev Electronics LLC, Grass Valley, CA (US); The Regents of the University of California, Oakland, CA (US); Benya Lighting Design, West Linn, OR (US)

( * ) Notice: Subject to any disclaimer, the term of this patent is extended or adjusted under 35 U.S.C. 154(b) by 1661 days.

(21) Appl. No.: 11/807,068

(22) Filed: May 24, 2007

(65) Prior Publication Data

US 2008/0005044 A1    Jan. 3, 2008

Related U.S. Application Data

(60) Provisional application No. 60/808,830, filed on May 25, 2006.

(51) Int. Cl.
*G05B 11/01* (2006.01)
*G05F 1/00* (2006.01)

(52) U.S. Cl. .................................. 340/12.33; 315/291

(58) Field of Classification Search .............. 340/310.12
See application file for complete search history.

(56) References Cited

U.S. PATENT DOCUMENTS

| | | | |
|---|---|---|---|
| 4,264,960 A | 4/1981 | Gurr | 364/492 |
| 4,408,185 A | 10/1983 | Rasmussen | 340/310 |
| 4,471,232 A | 9/1984 | Peddie et al. | 307/35 |
| 5,264,823 A | 11/1993 | Stevens | 340/310 |
| 5,555,167 A * | 9/1996 | Fujihashi | 363/49 |
| 5,559,395 A | 9/1996 | Venkitasubrahmanian et al. | 315/247 |
| 5,691,605 A | 11/1997 | Xia et al. | 315/307 |
| 5,872,429 A | 2/1999 | Xia et al. | 315/194 |
| 6,172,466 B1 | 1/2001 | Ki et al. | 315/224 |
| 6,229,271 B1 | 5/2001 | Liu | 315/291 |
| 2004/0000884 A1 * | 1/2004 | Inao et al. | 318/254 |
| 2005/0212459 A1 * | 9/2005 | Patel et al. | 315/291 |

* cited by examiner

*Primary Examiner* — Brian Zimmerman
*Assistant Examiner* — Omer S Khan
(74) *Attorney, Agent, or Firm* — Park, Vaughan, Fleming & Dowler LLP; Mark D. Spiller

(57) ABSTRACT

One embodiment of the present invention provides a system that uses power-line phase-cut signaling to change energy usage for one or more devices that share a common power signal. During operation, the system receives a request to change power usage. In response to the request, the system inserts a phase-cut notch into the common power signal. A device that is located downstream from the inserted phase-cut notch detects this notch in the common power signal, and in response triggers a power-state change. For instance, the device may trigger a reduced-power state when it detects a phase-cut notch.

21 Claims, 13 Drawing Sheets

METHOD AND APPARATUS FOR USING POWER-LINE PHASE-CUT SIGNALING TO CHANGE ENERGY USAGE

RELATED APPLICATION

This application claims priority under 35 U.S.C. section 119(e) to U.S. Provisional Application Ser. No. 60/808,830, entitled "Power Line Phase Cut Signaling," by inventors Erik Page, Michael Siminovitch, Konstantinos Papamichael, Don Aumann, James Benya, and Joel Snook, filed on 25 May 2006, the contents of which are herein incorporated by reference.

BACKGROUND

1. Field of the Invention

The present invention relates to a technique which facilitates changing energy usage in a given environment in response to an external request. More specifically, the present invention relates to a technique for using a power-line phase-cut signaling technique to change energy usage for one or more devices sharing a common power signal.

2. Related Art

The amount of energy which is used by a power grid can fluctuate greatly over time. This can be a problem, because there may not exist sufficient power-generation capacity to handle peak energy requirements. Utility companies typically use emergency-demand energy management techniques to avoid system overload and rolling blackouts during times of peak energy usage. For example, utility companies and state independent service operators (ISOs) can send a demand-response (DR) signal via the Internet or phone lines during peak periods to request that customers temporarily shed energy load until the peak periods have passed.

While sending such a signal to customers involves low infrastructure cost, automatically forwarding this signal to "sheddable" loads at each customer site can involve considerable cost. For instance, in most buildings, existing building automation and energy-control systems lack cannot shed individual loads or categories of loads, and adding such capabilities typically involves expensive rewiring. Alternative technologies, such as wireless mesh networks that use cellular and radio-frequency signals, can be used, but these alternative technologies typically require expensive hardware to be added to every device that receives the signal.

Hence, what is needed is a method and an apparatus for efficiently distributing requests to change energy usage to individual devices without the problems listed above.

SUMMARY

One embodiment of the present invention provides a system that uses power-line phase-cut signaling to change energy usage for one or more devices that share a common power signal. During operation, the system receives a request to change power usage. In response to the request, the system inserts a phase-cut notch into the common power signal. A device located downstream from the inserted phase-cut notch detects this notch in the common power signal, and in response triggers a power-state change. For instance, the device may trigger a reduced-power state when it detects a phase-cut notch.

In some embodiments of the present invention, the request is a demand-response (DR) request sent by one or more of the following: a utility company; an independent service operator; an energy aggregator; and/or an energy rate payer.

In some embodiments of the present invention, the request persists throughout a time period of reduced energy usage. The system outputs the modified power signal continuously through this time period, thereby preventing a phase-cut notch detector from needing to maintain information relating to the status and/or duration of the demand response state.

In some embodiments of the present invention, the system reduces energy usage while minimizing the additional wiring and modifications which need to be made between the point of modification of the common power signal and the one or more devices.

In some embodiments of the present invention, the common power signal is modified: at an individual circuit breaker for the device; following an individual circuit breaker for the device; and/or before an individual circuit breaker for the device at a location which covers more than one circuit breaker.

In some embodiments of the present invention, a phase-cutting device and a relay are placed in parallel in the path of the common power signal, and the system activates the relay when the request is received. When the relay is deactivated it short-circuits the phase-cutting device, thereby bypassing the phase-cutting device and preventing the phase-cut notch from being inserted into the power signal. Alternatively, when the relay is activated, it does not short-circuit the phase-cutting device, thereby allowing the phase-cutting device to insert the phase-cut notch into the common power signal. Bypassing the phase-cutting device during non-DR operation reduces power wastage in the phase-cutting device in the absence of a request to change power usage.

In some embodiments of the present invention, the phase-cutting device is a triode for alternating current (TRIAC).

In some embodiments of the present invention, one or more low-voltage field-effect transistors (FETs) are used to insert the phase-cut notch.

In some embodiments of the present invention, a capacitor filters the phase-cut energy corresponding to the sharp voltage change of a phase-cut notch. Note that the capacitor can filter the phase-cut notch even when the phase-cut notch is not at a zero-crossing of an alternating-current power signal. The capacitor is used to trigger a power-state change in one or more devices.

In some embodiments of the present invention, a bridge rectifier downstream from the capacitor generates a unipolar power signal. A second capacitor downstream from the bridge rectifier is used to trigger the power-state change in one or more devices.

In some embodiments of the present invention, a DR-aware system includes two devices controlled by separate switches that are located downstream from the inserted phase-cut notch. In this type of system, a phase-cut detector is located downstream from the first switch, and is set up to trigger a power relay that interrupts the power input for the second device (which is controlled by the second switch). If the request is received when both switches are closed, the phase-cut detector detects the phase-cut notch, and triggers the power relay to disable the flow of power to the second device. Alternatively, if only one of the two switches in on when the request is received, the states of the two devices do not change.

In some embodiments of the present invention, the power relay is actuated using captured energy stored by the second capacitor that actuates the power relay for the full phase of the alternating-current power signal. Also, a resistor may be used to reduce the voltage across the second capacitor and the bridge rectifier when no phase-cut notch is present. A Zener diode can also be used to limit the maximum voltage across the power relay and/or the second capacitor.

In some embodiments of the present invention, the phase-cut notch can be one or more of the following: a phase-cut in a leading edge of the power signal; a phase-cut in a trailing edge of the power signal; a phase-cut in a positive and/or negative edge of the power signal; phase-cuts in multiple edges of the power signal; single-polarity phase-cuts in one or more edges of the power signal; single-width phase cuts in one or more edges of the power signal; and/or multiple-width phase cuts in one or more edges of the power signal.

In some embodiments of the present invention, the system conveys multiple bits of information to the device by performing one or more of the following operations: adjusting the number of phase-cut notches in the common power signal; adjusting the width of one or more phase-cut notches; adjusting the polarity of one or more phase-cut notches; and/or adjusting the edges affected by one or more phase-cut notches.

In some embodiments of the present invention, the system detects the phase-cut notch in the common power signal using one or more of the following: a detection device built into a power-controlled device; a detection device external to a power-controlled device; a detection device built into a light switch; a detection device built into an electrical outlet, wherein one or more sockets in the electrical outlet are switched when a phase-cut notch is detected; and/or a detection device plugged into a socket of an electrical outlet, wherein one or more sockets in the detection device are switched when a phase-cut notch is detected.

In some embodiments of the present invention, the power-state change that is triggered in one or more devices can involve one or more of the following actions: sending a signal to a device being controlled; dimming a light (e.g., dimming the light to a factory-set or a user-set value); turning a device on or off; changing the speed of a multi-speed device; reducing a load for a device; changing a thermostat set point; changing a clock speed for a computing device; prompting a device to go into an energy-saving mode; changing a time-out for an occupancy sensor; performing a scheduling change for a device; and/or turning off a non-critical device.

In some embodiments of the present invention, the system displays an indication that energy usage is being changed. For instance, the indication can include one or more of the following: a light; a colored and/or flashing light; a sound; an alphanumeric text display; and/or a display indicating the level of power reduction in progress. Note that such displays may be included at one or more phase-cutting devices and/or phase-cut detectors.

In some embodiments of the present invention, the system selects a phase-cut notch size that can be detected but that does not interfere with the operation of and/or damage the device.

DETAILED DESCRIPTION

Figure 1A:
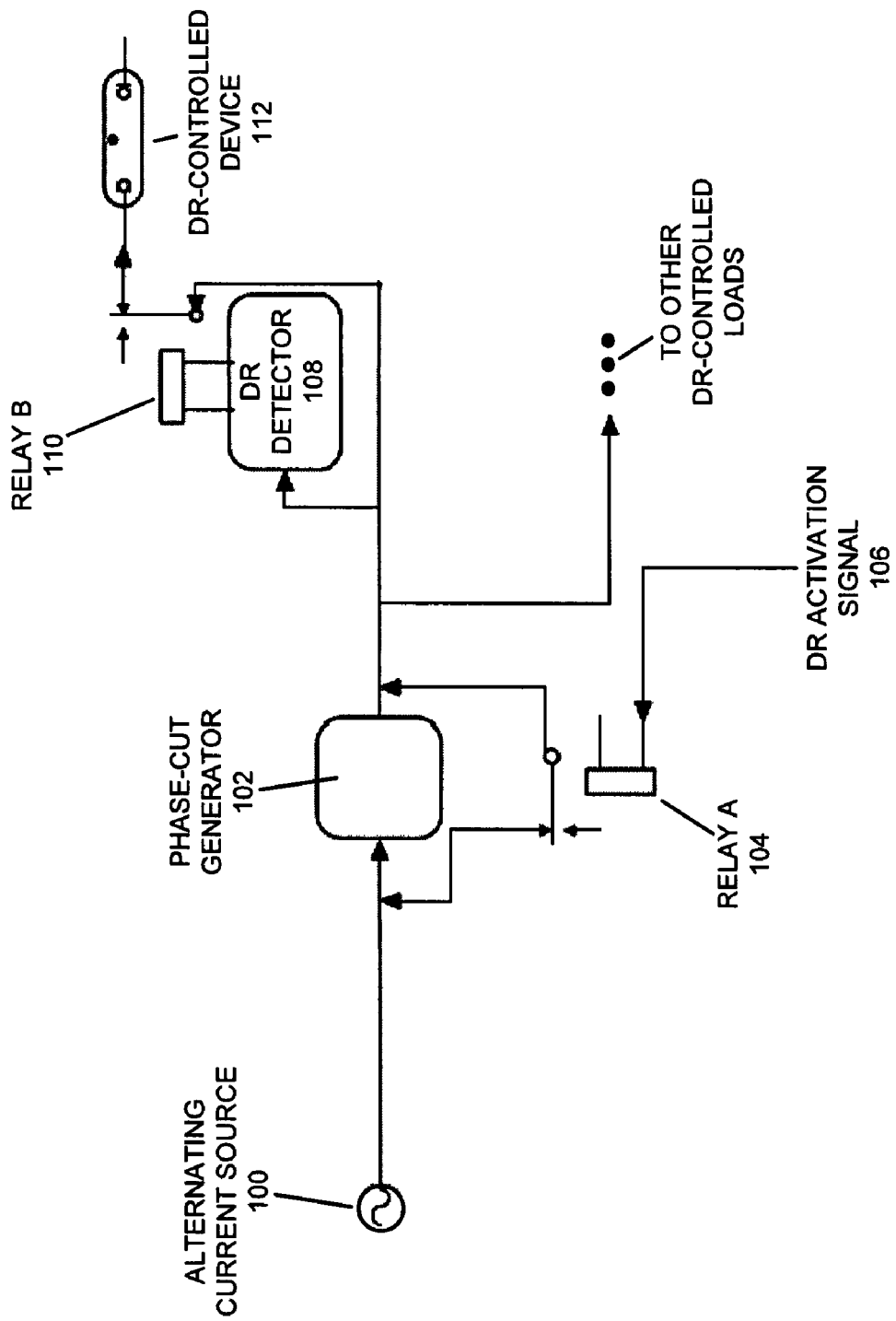
FIG. 1A illustrates a circuit in which a demand-response (DR) signal is communicated to devices using a power line in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Demand Response Requests

Providing sufficient energy generation capacity to handle peak demand intervals can involve considerable over-provisioning and expense. Utility companies and ISOs would prefer to avoid overload of the electrical grid by automatically shedding non-critical electrical loads during periods of peak usage. For instance, during periods of peak temperatures that cause a spike in energy usage due to increased air conditioning loads, utility companies may send a demand-response signal requesting non-critical energy loads to be turned off and/or delayed, thereby preventing system overload and rolling blackouts. Note that such overload conditions often involve reducing loads only very occasionally, and for short intervals, for instance on the order of ten hours in a given year.

Communicating the demand response signal from the utility company and/or ISO involves fairly low overhead, but automatically shedding energy loads in a given environment after detecting such a signal remains challenging. Users are often unlikely or unavailable to manually turn off non-critical loads, so an automatic and/or centralized shut-off mechanism is desirable. However, buildings typically are not designed and/or wired with such mechanisms. For instance, while distributed relay control panels may be installed to centrally-control lighting, chillers, and other important functionality, such services are typically considered critical or have insufficient selectivity of control, and hence are not candidates for reduction. Such centralized controls are typically not available to turn off non-critical devices that might not be missed for several hours, such as some of the lights in a room, laser printers, copiers, generic office equipment, and microwaves in kitchens. Furthermore, while new buildings can be designed to include centralized control mechanisms (with additional cost), new buildings comprise a relatively small proportion of buildings, and retrofitting existing structures to respond to demand-response requests can involve considerable cost and complexity.

In one embodiment of the present invention, a demand-response signal is communicated to devices using the power lines of a building. In doing so, small, continuous phase cuts are imposed on a common power line shared by one or more loads to signal loads to switch on, off, or otherwise change state. This signaling can be achieved by inserting phase cuts into the common power line, and then using compact, low-cost, and passive phase-cut detectors downstream from the common power line to detect the phase cuts and reduce non-critical loads.

Power-Line Phase-Cut Signaling

Power-line phase-cut signaling facilitates communicating with any load in the building. Such signaling can be centralized, for instance at a circuit breaker, so that only that one point in a building or other environment needs to be connected to a control signal. The modified power signals are carried by existing power wiring to each load to be controlled, thereby avoiding a need to run additional control wires or install a hardwired interface device at a given load. A number of inexpensive and compact passive phase-cut detectors can be installed at each load or group of loads to be controlled. These detectors use the energy in the phase-cut notches to actuate changes in power load, for instance triggering fluorescent step dimming, load idling, and/or other temporary reductions in building power use.

In one embodiment of the present invention, power-line phase-cut signaling can easily be retrofitted into new and existing buildings to add DR-control functionality for any device in the building. For instance, some state building codes already require the installation of two-level lighting systems, with two switches, to facilitate reducing energy load when needed. Such lighting systems are typically wired in a manner that would require extensive (and expensive) re-wiring to enhance one of the two switches with automatic DR-control. However, automatic DR-control could be achieved using power-line phase-cut signaling by installing sending modules at circuit breaker panels and either replacing downstream switches with compatible detection devices or wiring detection devices to existing switches within existing enclosures. Note that no additional wiring is needed between the DR sending unit and the devices that detect the modified power signal. Adding a small number of components to inject the modified signal and detect the modified signal at a switch and/or device can provide a cheap, efficient DR-control solution that involves no rewiring cost, no programming cost, and no commissioning cost, and can be easily designed, installed, and tested without changing any loads. The additional power-line phase-cut signaling and detection components use a communication channel with very low communication complexity to change one or more loads for the duration of a request. When the DR-request no longer active, the loads are returned to a non-DR state.

FIG. 1A illustrates a circuit in which a DR signal is communicated to devices using a power line. Phase-cutting device 102 and relay A 104, which can short-circuit the phase-cutting device 102, are placed in parallel downstream from an alternating-current (AC) source 100. DR detector 108 is connected to the power signal passing through the circuit, and controls relay B 110. Relay B 110 controls a switch that can prevent the power signal from reaching DR-controlled device 112. Note that relay B 110 may default to a non-reduced load mode as a fail-safe. Note also that bypassing the phase-cutting device reduces any power wastage associated with the phase-cutting device during non-DR operation.

During non-DR operation, relay A 104 remains deactivated, and the power signal passing through the circuit remains an unmodified AC signal. For example, DR detector 108 receives this power signal during non-DR operation, but does not detect a phase-cut notch, and hence relay B 110 remains deactivated, and DR-controlled device 112 continues to receive power.

When a DR activation signal is received, relay A 104 is activated, breaking the short-circuit that bypasses the phase-cutting device 102. The power signal now passes through phase-cutting device 102, which inserts a phase-cut notch into the circuit downstream from phase-cutting device 102. DR detector 116 now detects a phase-cut notch, and activates relay B 110, thereby preventing the power signal from reaching DR-controlled device 112.

Figure 1B:
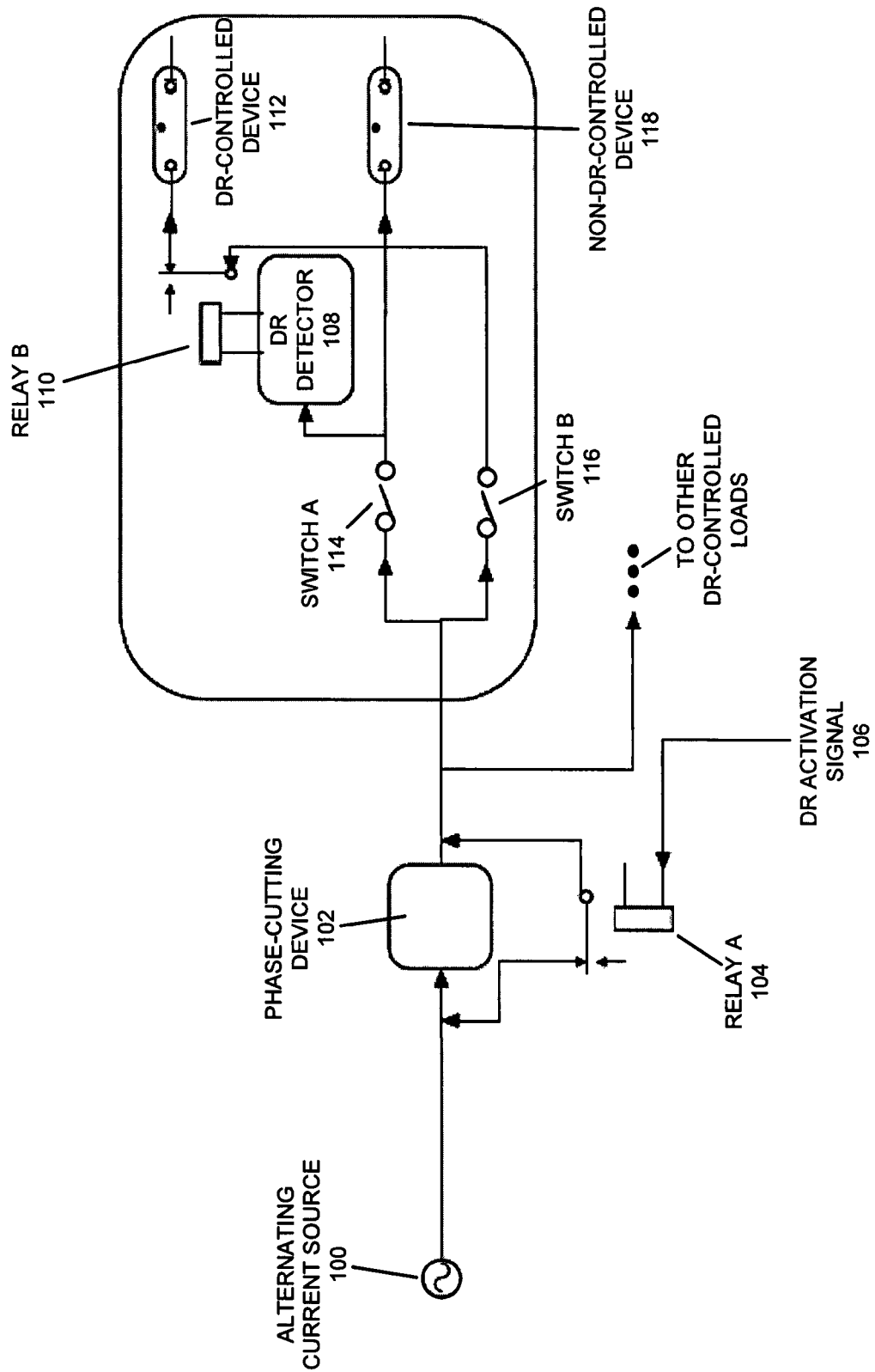
FIG. 1B illustrates a more complex circuit in which a DR signal is communicated to devices using a power line in accordance with an embodiment of the present invention.

FIG. 1B illustrates a more complex circuit in which a DR signal is communicated to devices using a power line. The circuit downstream from phase-cutting device 102 and relay A 104 now also includes two switches, switch A 114 and switch B 116, which are used to control the flow of power to non-DR-controlled device 118 and DR-controlled device 112, respectively. For instance, non-DR-controlled device 118 and DR-controlled device 112 may be two lights in a DR-aware two-level lighting system. DR detector 108 is connected to the power signal flowing through the circuit controlled by switch A 114.

During non-DR operation, relay A 104 remains deactivated, and the power signal flowing through the circuit remains an unmodified alternating current signal. Relay B 110 remains deactivated, and non-DR-controlled device 118 and DR-controlled device 112 operate normally, receiving power if switch A 114 and switch B 116, respectively, are closed.

As described previously, during DR operation, relay A 104 is activated, breaking the short-circuit that bypasses the phase-cutting device 102, and a phase-cut notch is inserted into the power signal downstream from phase-cutting device 102. Hence, if switch A is closed, DR detector 108 now detects a phase-cut notch, and activates relay B 110, thereby preventing the power signal from reaching DR-controlled device 112 and reducing the system energy load.

Note that during DR operation, this circuit reduces energy usage in the case when both switches are closed, but does not change the power flow for either of the devices if only one of the two switches is closed. Consider DR-controlled device 112 and non-DR-controlled device 118 to be two lights in a DR-aware lighting system. If users have already reduced their energy usage by turning off one of the switches, the remaining light will not be switched off. For instance, if switch A 114 is open, and switch B 116 is closed, DR detector 108 will not receive the (modified) power signal, and hence will not trigger relay B 110 to prevent power from reaching DR-controlled device 112. Alternatively, if switch A 114 is closed and switch B 116 is open, non-DR-controlled device 118 remains on and DR detector 108 triggers relay B 110. However, because DR-controlled device 112 is already off, triggering relay B 110 in this situation has no additional effect. Hence, the circuit shown in FIG. 1B allows users to turn off either of the two switches without risking all lights turning off during DR operation.

Figure 2:
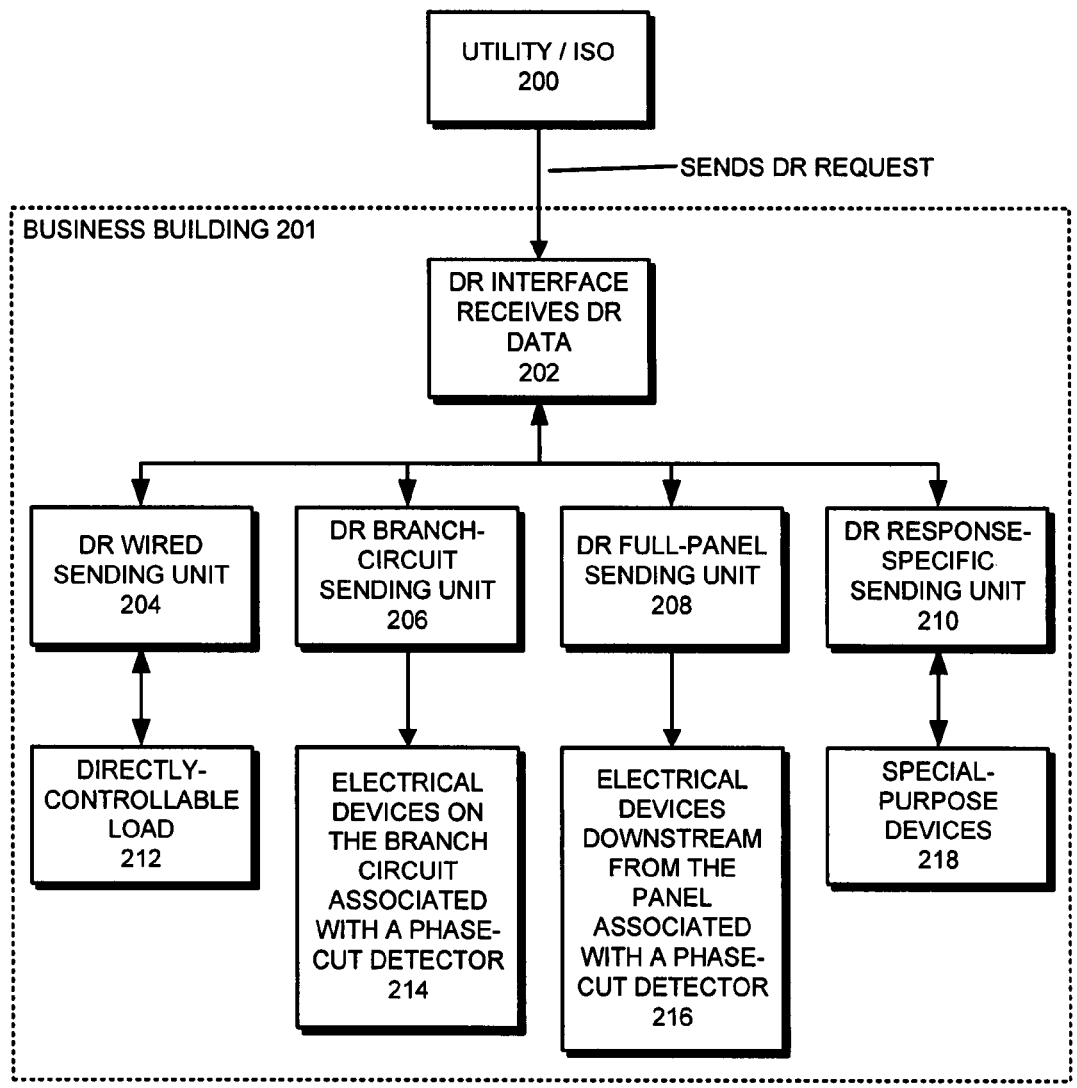
FIG. 2 illustrates the propagation of a DR signal in an exemplary DR system that incorporates power-line phase-cut signaling in accordance with an embodiment of the present invention.

FIG. 2 illustrates the propagation of a DR signal in an exemplary DR system that incorporates power-line phase-cut signaling. During a peak usage period, a utility or ISO 200 sends a DR request to a given environment, such as a business building 201. This signal can be conveyed using a variety of mediums, including the Internet, radio-frequency broadcast, leased line, or manual activation. A DR interface in this environment receives the DR data 202 from the request, and interacts with one or more programmable DR sending units in the environment (204-210) that in turn propagate the DR request to energy loads in the environment. For instance, DR branch-circuit sending unit 206 may use power-line phase-cut signaling to inject a phase-cut notch in the power signal into one branch circuit in the environment, thereby signaling the need for a reduced load to electrical devices on the branch circuit that are associated with a phase-cut detector. Alternatively, DR full-panel sending unit 208 may use power-line phase-cut signaling to inject a phase-cut notch in the power signal for every sub-circuit of the panel, thereby signaling the need for a reduced load to all of the electrical devices associated with phase-cut detectors that are downstream from the panel 216.

Note that a DR interface may also interact with DR-aware devices using other interfaces, and that such devices may or may not also be present on circuits affected by power-line phase-cut signaling. For instance, a set of directly-controllable loads 212 may be adjusted during DR operation using a DR wired sending unit 204 that can communicate using low-voltage wiring or an RS485 interface. Examples of such loads can include existing building automation systems or energy automation systems controlling loads such as lighting and various components of an HVAC system. Another DR response-specific sending unit 210 may be used in buildings with large assets and/or special purpose devices 218 that are chosen to be turned on or off in response to a DR operation. For instance, such devices may include a generator that turns on during DR operations to ensure that the building maintains power while also reducing the load on the energy grid, or a large ground water pump in a water supply plant, which may be temporarily turned off. Such large assets typically include an independent, hard-wired control system, and hence may operate separately from any power-line phase-cut signaling.

Figure 3:
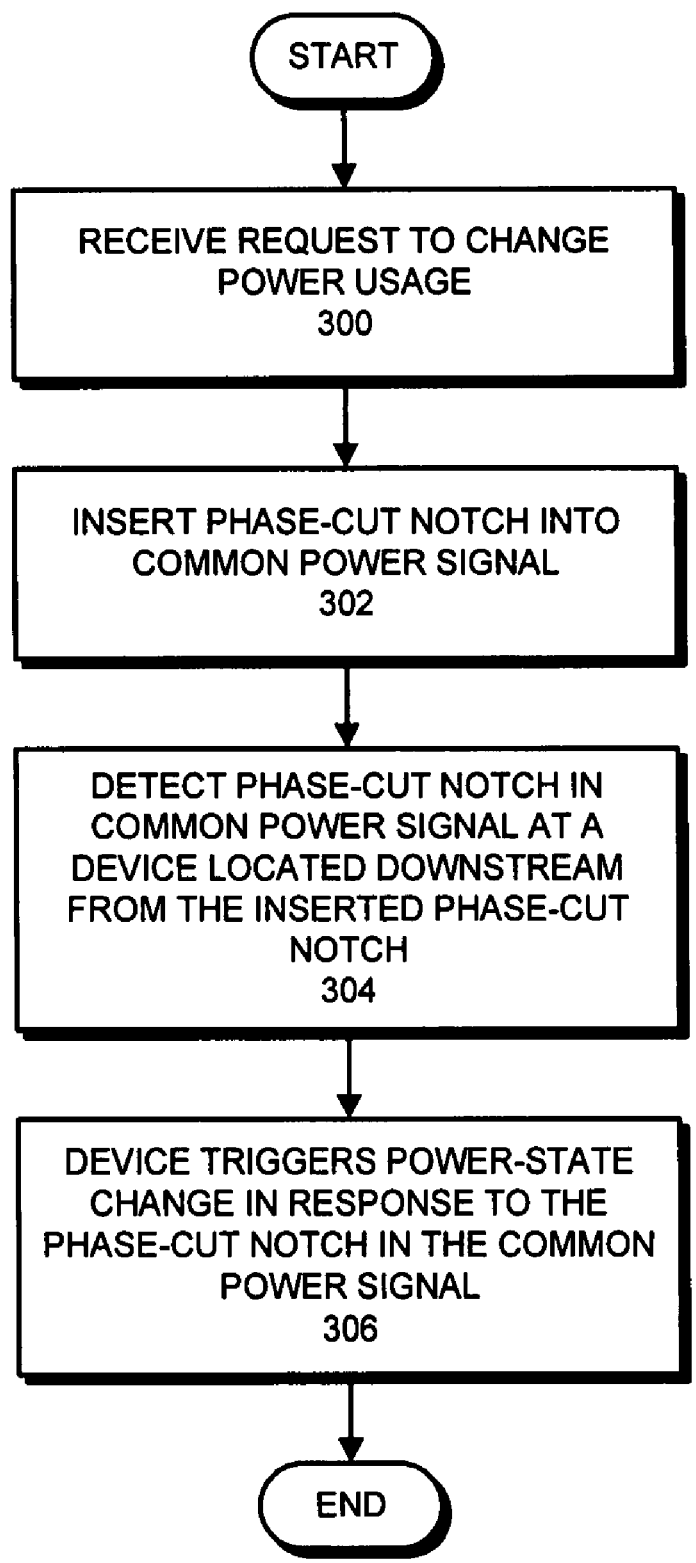
FIG. 3 presents a flow chart illustrating the process of using power-line phase-cut signaling to change energy usage for one or more devices sharing a common power signal in accordance with an embodiment of the present invention.

FIG. 3 presents a flow chart illustrating the process of using power-line phase-cut signaling to change energy usage for one or more devices sharing a common power signal. First, the system receives a request to change power usage (operation 300), for instance from a utility or ISO. In response to this request, a DR sending unit inserts a phase-cut notch into a common power signal in the system (operation 302). This phase-cut notch in the common power signal is detected in a device located downstream in the circuit from the point where the notch is inserted (operation 304). This device may trigger a power-state change in response to detecting the phase-cut notch (operation 306). Note that after some time interval, the utility or ISO will indicate that the request is no longer active, at which point: (1) the system stops inserting the phase-cut notch into the common power signal; and (2) the downstream device(s) no longer detect phase-cut notches in the common power signal, and hence no longer trigger the power-state change.

Creating Phase-Cut Notches

One embodiment of the present invention provides power-line phase-cut signaling by employing a low-repetition rate phase-cut signal and minimizing the amount of data that needs to be communicated to shed a load. The system uses a phase-cutting device that allows: (1) an alternating-current (AC) power signal to pass through unchanged during normal operation; (2) cuts out a small notch in the AC power signal during a power-state change request; and then (3) restores the unmodified AC power signal when the request has completed.

One embodiment of the present invention sends a simplex (or one-way) signal from the phase-cutting device to one or more phase-cut detectors. Power lines are often poor signal-carrying lines that do not lend themselves to duplex communication, especially over distance. Requiring duplex communication over such a channel can place a significant burden on transmitters on both sides of the communication. Using simplex communication facilitates communicating a power-change request over virtually unlimited distances.

Note that simplex communication reduces complexity but may sometimes present reliability issues. Simplex communication using analog systems avoids overhead relating to digital data encoding/decoding and duplex handshaking, but does not provide a return channel to acknowledge that the power-change signal has been received and/or send other feedback. However, the system does not need feedback, because it can signal an ongoing power-change request by persistently maintaining the phase-cut notch in the power signal for the time period that the request is active. In this configuration, no return signal is needed; all devices detecting the phase-cut notch can independently adjust their power load to reduce system load. The system can achieve a reduced load even if all of the devices do not detect the phase-cut notch.

The phase-cut transmissions employed by the system propagate down the power lines affected to reach the desired set of devices. The downstream path of the modified power signal can be determined based on the placement of one or more phase-cutting devices. For instance, phase-cutting devices might be placed in, on, before, or after a circuit breaker box. The fact that such power signals propagate only downstream minimizes any potential interference to loads not intended to be reduced.

In one embodiment of the present invention, the system and/or a system designer selects a phase-cut notch size that can be detected by the phase-cut detectors but does not interfere with the operation of and/or damage any devices in the system. For instance, the inserted phase-cut notch typically should be of sufficiently short duration to minimize power quality degradation and to minimize any potential effects on magnetic devices. For example, the modified power signal typically should not change the lighting output of individual lighting devices (that are not powered off during the power-state change). The system and/or system designer may as a result choose a conservative phase-cut notch size that errs on the side of missing signals to reduce any chance of damaging devices. Such a choice may result in slightly less power reduction overall, but may be a reasonable trade-off compared to device damage.

In one embodiment of the present invention, the phase-cut notch can be one or more of the following: a phase-cut in a leading edge of the power signal; a phase-cut in a trailing edge of the power signal; a phase-cut in a positive and/or negative edge of the power signal; phase-cuts in multiple edges of the power signal; single-polarity phase-cuts in one or more edges of the power signal; single-width phase cuts in one or more edges of the power signal; and/or multiple-width phase cuts in one or more edges of the power signal.

Figure 4A:
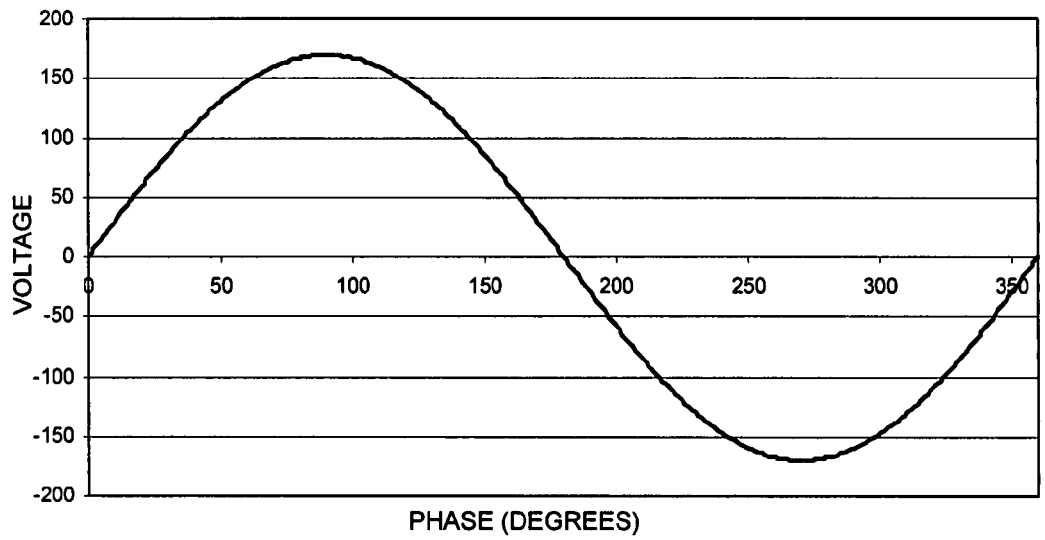
FIG. 4A illustrates the sine curve of an alternating-current (AC) power signal in accordance with an embodiment of the present invention.
Figure 4B:
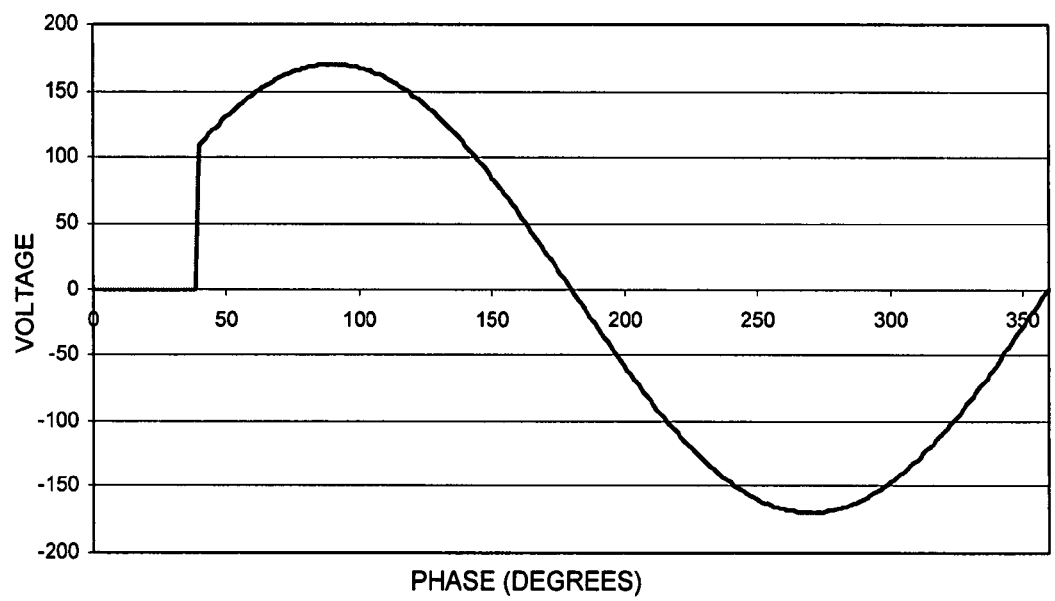
FIG. 4B illustrates an AC power signal modified to include a phase-cut notch in the first quadrant in accordance with an embodiment of the present invention.
Figure 4C:
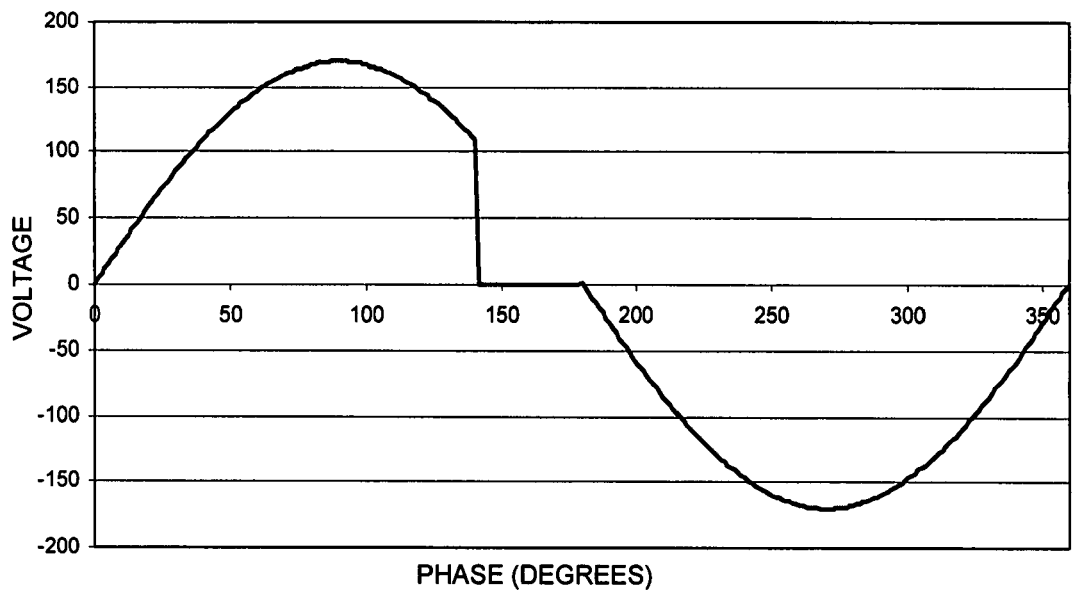
FIG. 4C illustrates an AC power signal power signal modified to include a phase-cut notch in the second quadrant in accordance with an embodiment of the present invention.
Figure 4D:
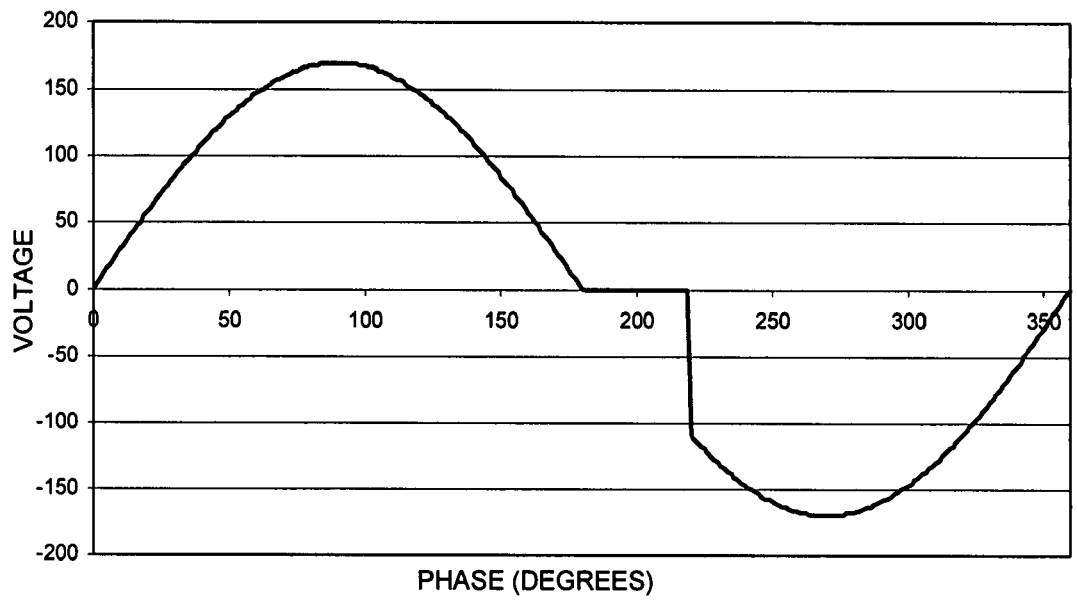
FIG. 4D illustrates an AC power signal power signal modified to include a phase-cut notch in the third quadrant in accordance with an embodiment of the present invention.
Figure 4E:
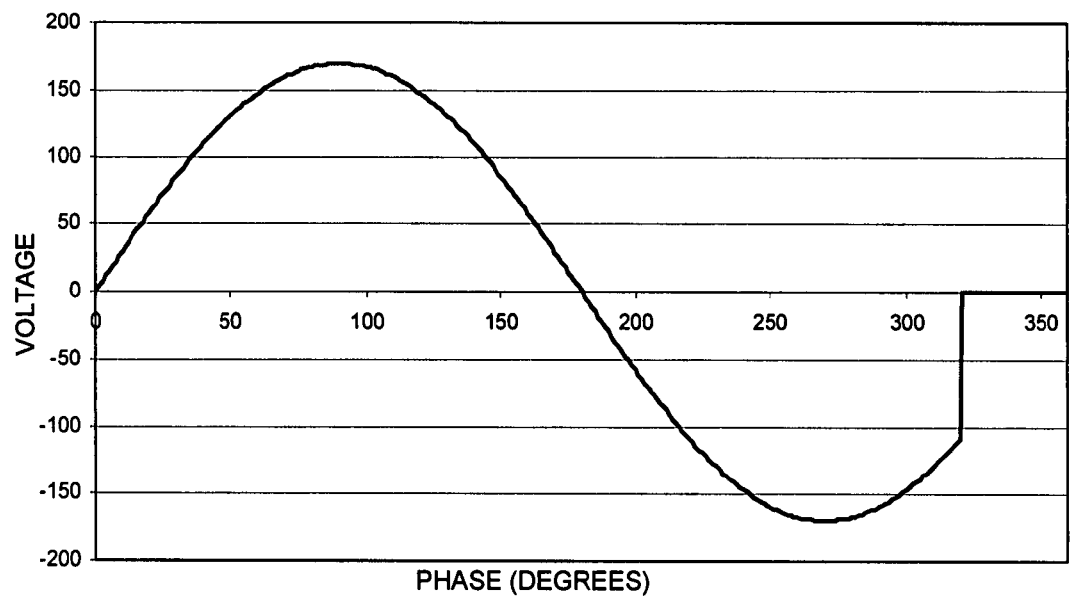
FIG. 4E illustrates an AC power signal power signal modified to include a phase-cut notch in the fourth quadrant in accordance with an embodiment of the present invention.
Figure 4F:
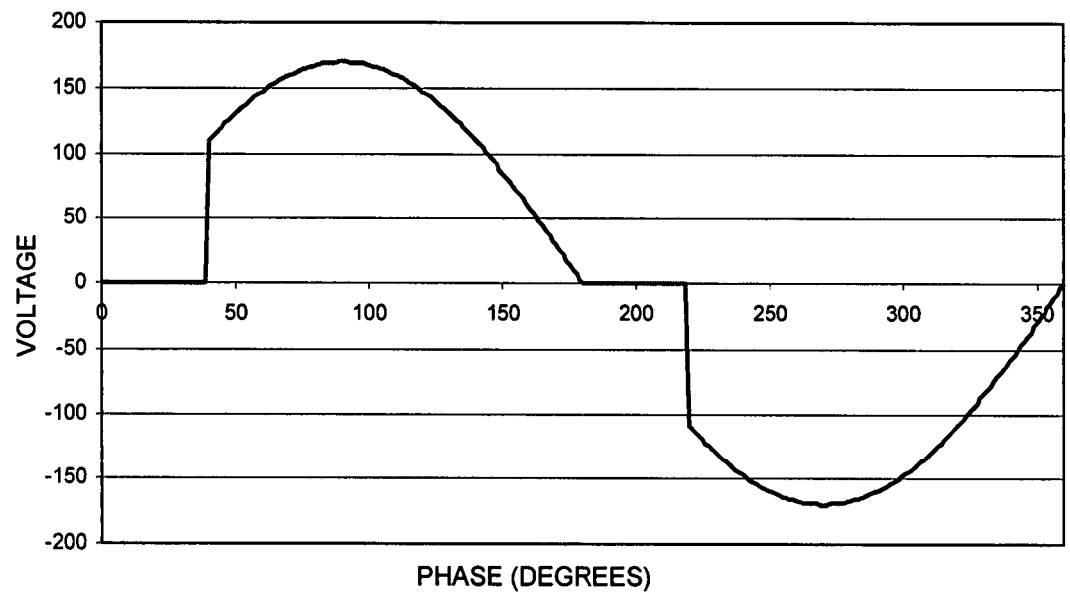
FIG. 4F illustrates an AC power signal power signal modified to include phase-cut notches in both of the leading edges of the power signal in accordance with an embodiment of the present invention.
Figure 4G:
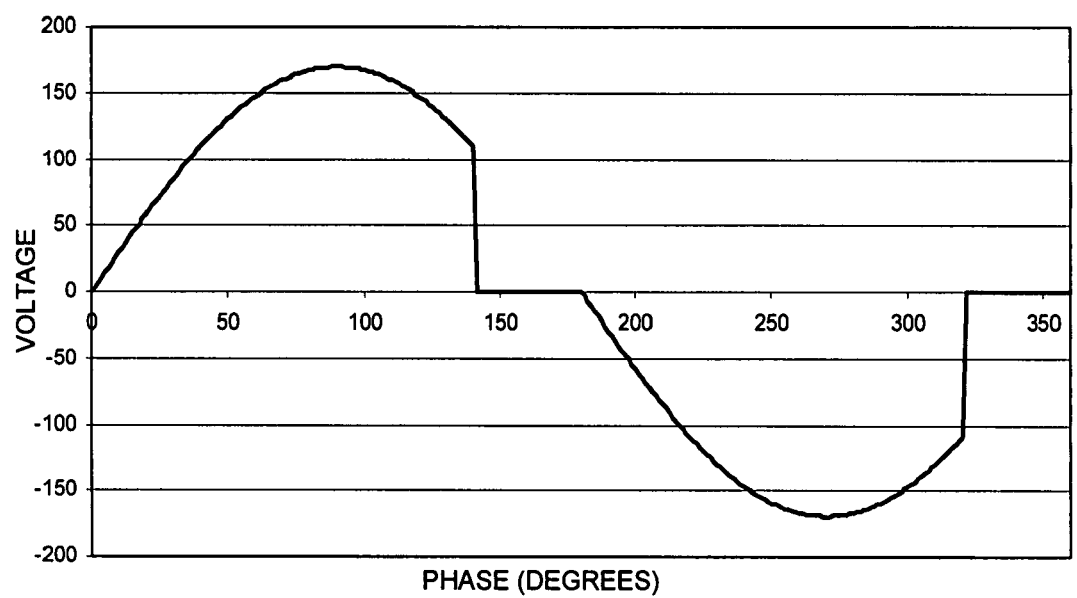
FIG. 4G illustrates an AC power signal power signal modified to include phase-cut notches in both of the trailing edges of the power signal in accordance with an embodiment of the present invention.

FIG. 4A illustrates the sine curve of an AC power signal. FIG. 4B illustrates an AC power signal modified to include a phase-cut in the first quadrant. Note that the AC power signal may also be modified to include phase-cuts notches in other, additional, and/or all quadrants. FIG. 4C illustrates an AC power signal modified to include a phase-cut notch in the second quadrant. FIG. 4D illustrates an AC power signal modified to include a phase-cut notch in the third quadrant. FIG. 4E illustrates an AC power signal modified to include a phase-cut notch in the fourth quadrant. Note that the AC power may include multiple notches. FIG. 4F illustrates an AC power signal modified to include phase-cut notches in both of the leading edges of the power signal. FIG. 4G illustrates an AC power signal modified to include phase-cut notches in both of the trailing edges of the power signal.

One embodiment of the present invention uses a triode for alternating current (TRIAC) in a phase-cutting device. TRIACs are often used in dimmers to switch large amounts of AC power. However, TRIACs typically subtract a small voltage drop from the AC power passing through them while in the "on" state, for instance dissipating a constant 1-1.5V for a given current or voltage. The resulting wasted wattage may be sizable for a large current, and hence require a heat sink to dissipate the resulting heat. For instance, a TRIAC that dissipates 1V of the voltage in a 16 A AC circuit may need to dissipate 16 W of heat dissipation by using a heat sink. A TRIAC used to inject a phase-cut notch during a DR request may also still inject a small phase-cut notch during non-DR operation, thereby lowering power quality (e.g., by increasing harmonic distortion on the AC power). Note that a injecting a phase-cut notch may also inject radio-frequency interference (RFI), and hence motivate adding a filter that removes high-frequency RFI.

One embodiment of the present invention places a relay in parallel with a phase-cutting device (as illustrated in FIGS. 1A-1B). This relay can automatically short-circuit the phase-cutting device during non-DR operation, thereby reducing energy wastage and ensuring that no notching occurs during non-DR operation. Because automatic approaches are more likely to be used in a timely and error-free manner than manual bypasses, such an automatic relay can significantly improve the likelihood of load shedding and system ease-of-use.

One embodiment of the present invention uses field-effect transistors (FETs) to insert a phase-cut notch. As mentioned previously, heat dissipation in TRIACs typically motivates using a heat sink on a phase-cutting device. Such a heat sink may interfere with incorporating the phase-cutting device into a circuit breaker. FETs provide an alternative method of switching power. While individual FETs often may have a lower efficiency than a TRIAC, multiple FETs can be placed in parallel to create a low-resistance, high-efficiency phase-cutting device. Hence, a number of FETs can be used to achieve a desired level of efficiency, without the heat dissipation requirements of TRIACs. Note that placing a number of TRIACs in parallel typically does not improve overall efficiency, nor reduce head dissipation requirements.

High-voltage FETs can handle AC line voltages, but typically have high resistance. Hence, many high-voltage FETs in parallel are needed to achieve a desired low resistance, which may not be practical due to cost and size issues. Because only a small part of the AC waveform needs to be blocked, an alternate approach can use low-voltage FETs to generate notches in high-voltage waveforms. The low-voltage FETs are used while the waveform is still at low voltage, and the FETs are on during the high-voltage portion of the waveform. Because low-voltage FETs typically have lower resistance than high-voltage FETs, fewer FETs many be needed, resulting in an economical solution that provides superior performance (compared to a TRIAC-based approach) and eliminates the previously-described bypass relay. Note that low-voltage in this description is considered as being more than the end of phase-cut voltage and less than the peak main voltage. For instance, a 50V FET may be used to put a 30V phase-cut notch in a 400V sine wave. When notching, the FET only withstands up to 30V. When not notching, the FET shorts itself out, resulting in an effective voltage difference of 0V across the FET.

Note that not blocking both polarities of the AC signal for phase cuts could effectively reduce the number and cost of FETs by four times, but may add cost to the phase-cut detectors and add an unwanted direct-current (DC) offset to the AC power.

Note also that an AC power line can be clamped to approximately zero volts during the leading or trailing phase-cut period if inductive loads cause problems by sourcing current and filling in the phase-cuts, for instance by using: a pair of FETs; FETs and diodes; insulated-gate bipolar transistors (IGBTs) and diodes; and bipolar transistors and diodes. Clamping can also be applied to capacitive loads that fill in phase-cuts. TRIACs or silicon-controlled rectifiers (SCRs) may also be used to clamp trailing-edge phase cuts.

Detecting Phase-Cut Notches

In one embodiment of the present invention, a phase-cut detector detects a rapid and abrupt increase in line voltage deriving from a phase-cut notch. Such a phase-cut detector can take a number of different forms. For instance, a phase-cut detector can be one or more of the following: a detection device built into a power-controlled device; a detection device external to a power-controlled device; a detection device built into a light switch; a detection device built into an electrical outlet, wherein one or more sockets in the electrical outlet are switched when a phase-cut notch is detected; and/or a detection device plugged into a socket of an electrical outlet, wherein one or more sockets in the detection device are switched when a phase-cut notch is detected.

Figure 5:
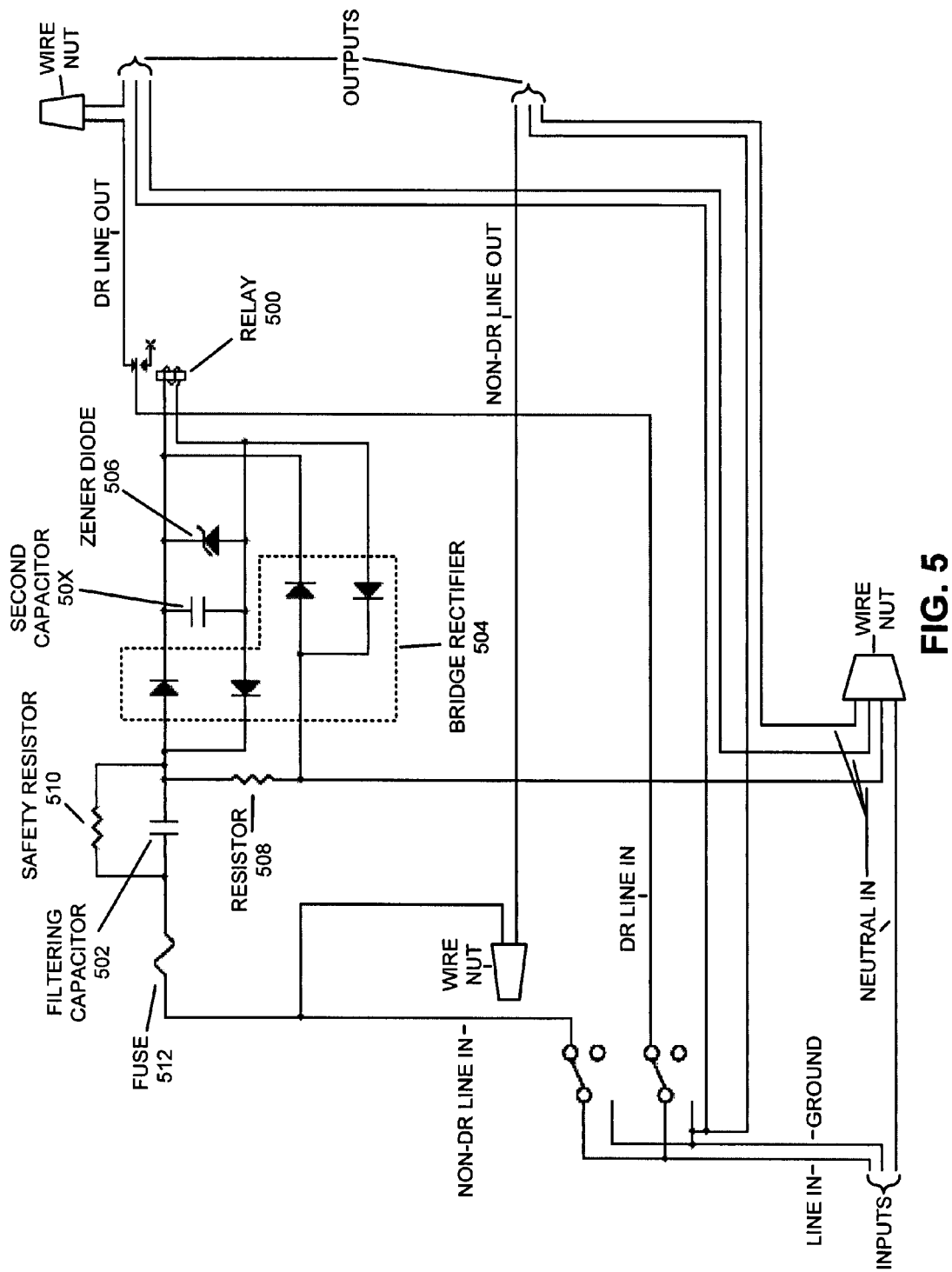
FIG. 5 illustrates a detection circuit that detects a phase-cut notch and uses the energy from the phase-cut notch to actuate a relay that can affect the energy usage of a connected load in accordance with an embodiment of the present invention.

FIG. 5 illustrates a detection circuit that detects a phase-cut notch and uses the energy from the phase-cut notch to actuate a relay 500 that can affect the energy usage of a connected load. Note that this circuit corresponds to the circuit displayed in FIG. 1B, and illustrates the internal components of the DR detector 108 shown in FIG. 1B.

In FIG. 5, a filtering capacitor 502 filters out the energy from a normal AC sine wave, but passes energy from a phase-cut notch. During non-DR operation the capacitor minimizes the current across resistor 508. However, during DR operation, a phase-cut notch results in the filtering capacitor 502 temporarily short-circuiting and hence passing a higher current that is dissipated by resistor 508. The resulting high voltage across resistor 508 is passed on to a bridge rectifier 504 downstream from the filtering capacitor 502, which can include a second capacitor and one or more diodes. The bridge rectifier 504 generates a unipolar power signal that can trigger a power-state change in one or more devices, for instance by actuating a relay 500 that controls a power signal farther downstream in the circuit. A Zener diode 506 may also be used to limit the maximum voltage across the relay 500 and/or the second capacitor. An additional safety resistor 510 and/or a fuse 512 may be included to address overload and/or safety concerns.

Note that the circuit shown in FIG. 5 detects a phase-cut notch without requiring additional components, such as a power supply and/or microprocessor to detect and measure the phase cut and/or control the relay. The capacitors used act to both detect the phase-cut notch and actuate relay 500. Note also that in some situations magnetic ballasts may partially fill-in phase-cut notches, or shift the notch from the zero-crossing of a sine wave to partway up the waveform. The capacitors and circuit described can still detect such a shifted phase-cut notch.

Figure 6A:
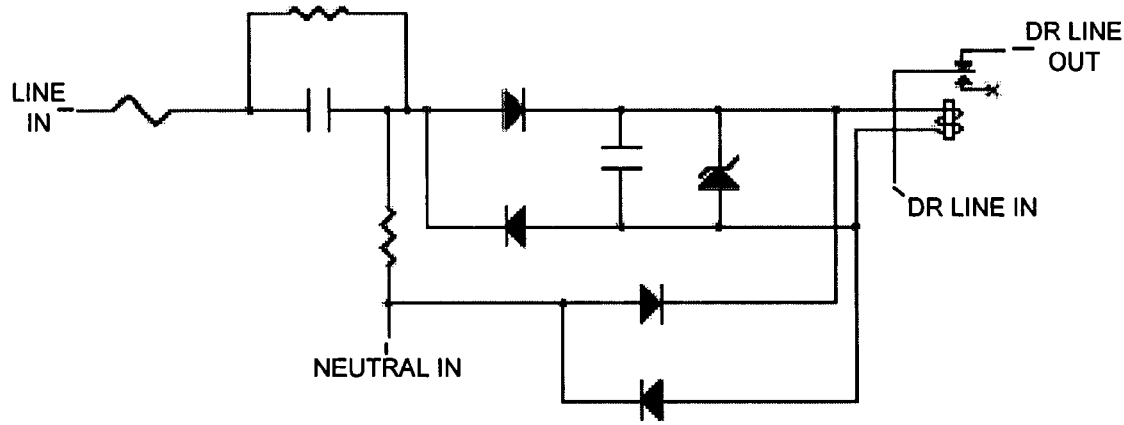
FIG. 6A illustrates a portion of the detection circuit from FIG. 5 in accordance with an embodiment of the present invention.

FIG. 6A illustrates a portion of the detection circuit from FIG. 5, as a comparison point. The circuit in FIG. 6A detects leading-edge phase cuts of either polarity. FIGS. 6B-6H illustrate alternative detection circuits that use fewer components than the circuit shown in FIG. 6A.

Figure 6B:
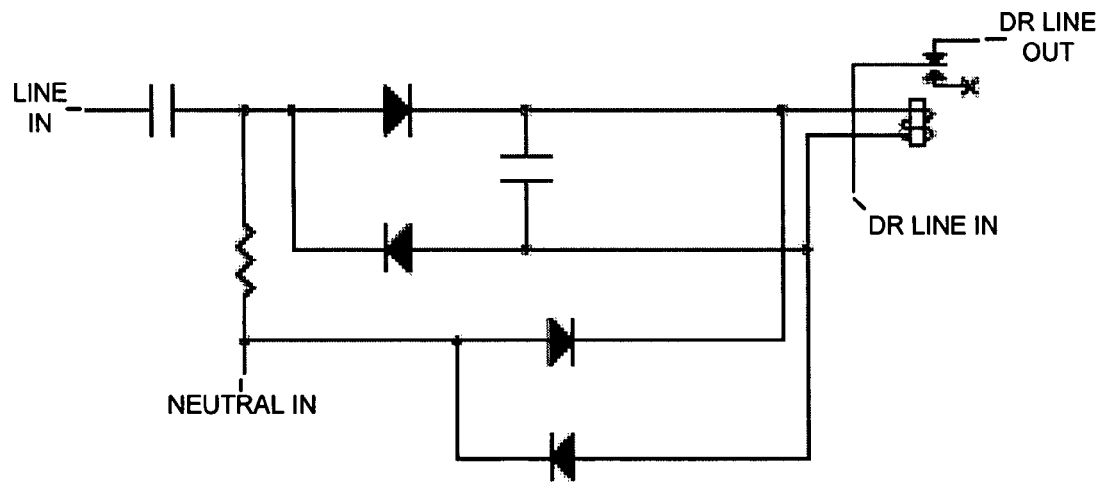
FIG. 6B illustrates the detection circuit of FIG. 6A after removing a fuse, safety resistor, and Zener diode in accordance with an embodiment of the present invention.

FIG. 6B illustrates a variation of the circuit illustrated in FIG. 6A, in which the fuse 512, safety resistor 510, and Zener diode 506 have been removed from the previous circuit to create a simpler detection circuit.

Figure 6C:
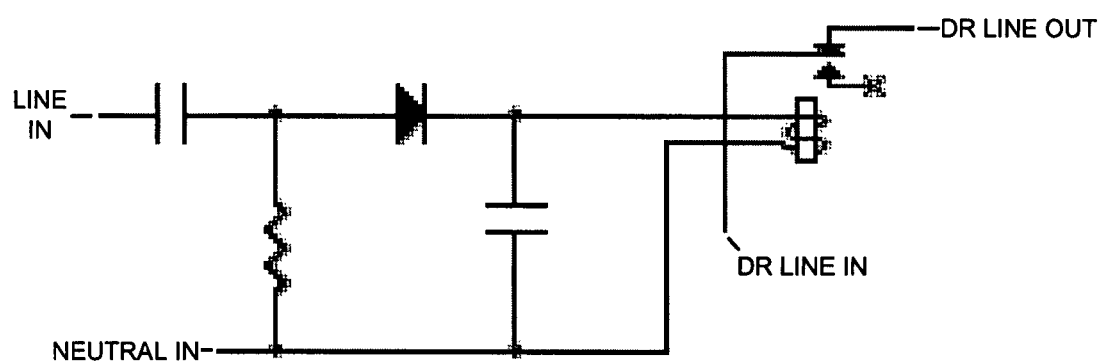
FIG. 6C illustrates a detection circuit that detects a leading-edge phase cut of positive polarity in accordance with an embodiment of the present invention.
Figure 6D:
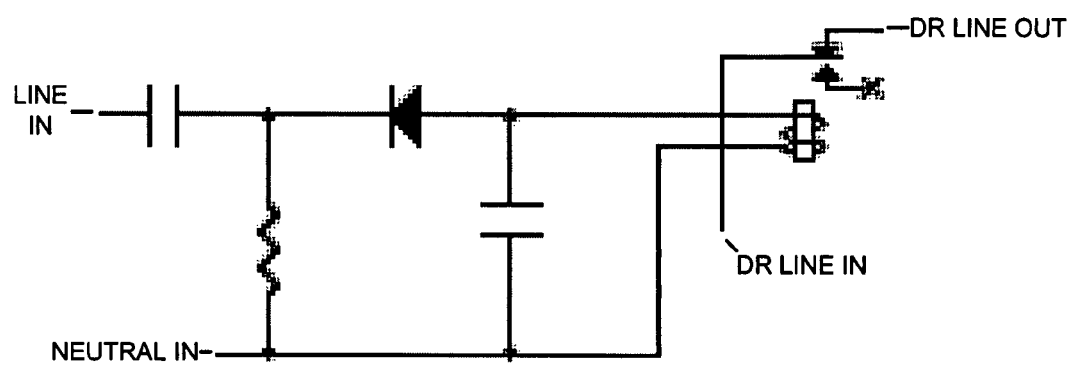
FIG. 6D illustrates a detection circuit that detects a leading-edge phase cut of negative polarity in accordance with an embodiment of the present invention.

FIGS. 6C and 6D illustrate alternate detection circuits with fewer diodes. A detection device with an efficient relay may only need to detect one of the positive or negative phase cuts, and hence may not need all of the diodes included in FIG. 6A. FIG. 6C illustrates a detection circuit that detects a leading-edge phase cut of positive polarity. FIG. 6D illustrates a detection circuit that detects a leading-edge phase cut of negative polarity.

Figure 6E:
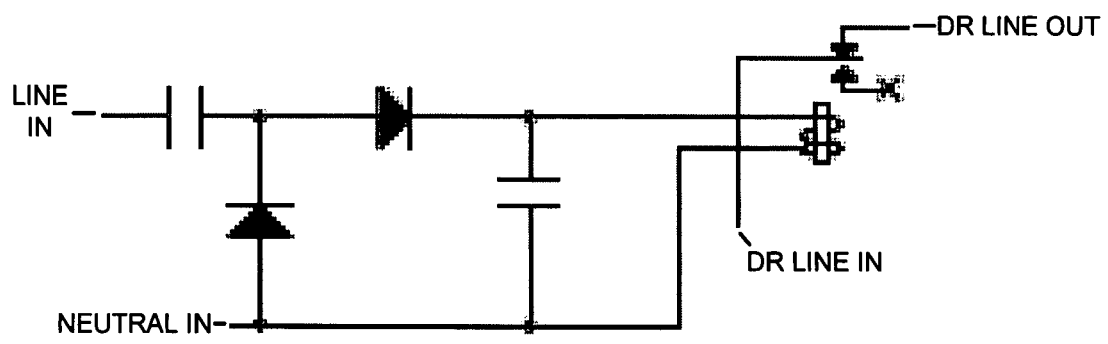
FIG. 6E illustrates a finely-tuned detection circuit that balances the capacitance of the two capacitors and the characteristics of the relay to detect a leading-edge phase cut of positive polarity in accordance with an embodiment of the present invention.
Figure 6F:
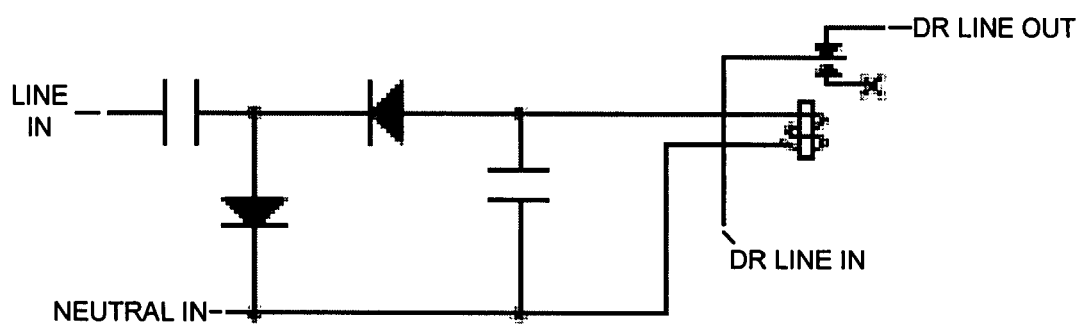
FIG. 6F illustrates a finely-tuned detection circuit that balances the capacitance of the two capacitors and the characteristics of the relay to detect a leading-edge phase cut of negative polarity in accordance with an embodiment of the present invention.

FIGS. 6E-6F illustrate detection circuits from which the resistor 508 has been removed to reduce the amount of power used. The detection circuits in FIGS. 6E-6F tune the ratio of capacitance between the two capacitors with the characteristics (such as the behavior and the voltage range) of the relay to provide detection capability without the use of resistor 508. FIG. 6E illustrates a finely-tuned detection circuit that balances the capacitance of the two capacitors and the characteristics of the relay to detect a leading-edge phase cut of positive polarity. FIG. 6F illustrates a finely-tuned detection circuit that balances the capacitance of the two capacitors and the characteristics of the relay to detect a leading-edge phase cut of negative polarity.

Figure 6G:
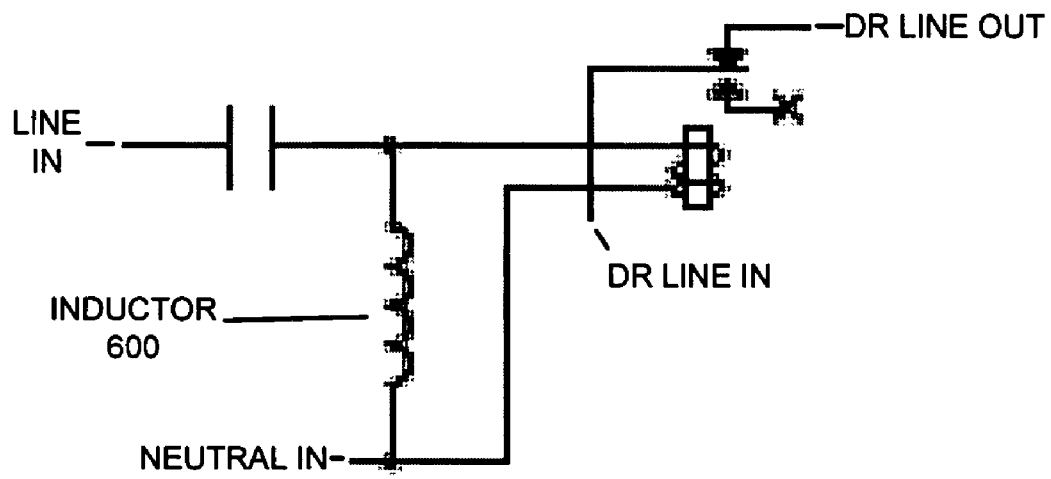
FIG. 6G illustrates a detection circuit that uses the properties of an inductor to actuate the relay in accordance with an embodiment of the present invention.

FIG. 6G illustrates a detection circuit that uses the properties of an inductor to actuate the relay. This inductor 600 bleeds off the low frequency of an input without a phase-cut notch but blocks the high frequency of an input with a phase-cut notch (thereby creating a voltage that actuates the relay).

Figure 6H:
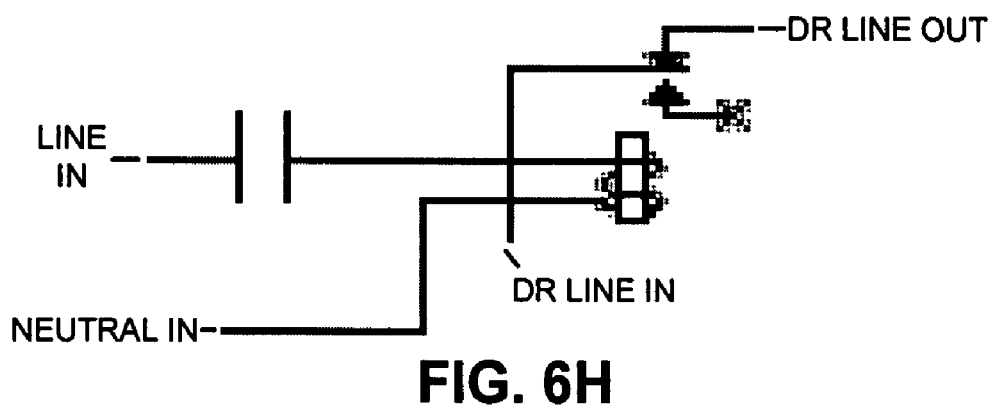
FIG. 6H illustrates a detection circuit that uses a finely-tuned capacitor and relay pair in accordance with an embodiment of the present invention.

FIG. 6H illustrates a detection circuit that uses a finely-tuned capacitor and relay pair. These two components are carefully chosen to provide an extremely simple and inexpensive circuit that does not actuate the relay when powered by a normal AC-power sine wave, but does actuate the relay when powered by a modified sine wave that includes a phase-cut notch.

In one embodiment of the present invention, a power-state change triggered in one or more devices can include a variety of detailed and customized actions, such as one or more of the following: sending a signal to a device being controlled; dimming a light (e.g., dimming the light to a factory-set- or a user-set value); turning a device on or off; changing the speed of a multi-speed device; reducing a load for a device; changing a thermostat set point; changing a clock speed for a computing device; prompting a device to go into an energy-saving mode; changing a time-out for an occupancy sensor; performing a scheduling change for a device; and/or turning off a non-critical device (e.g., turning off a laser printer, refrigerator compressor, pool pump, or hot tub temporarily).

In one embodiment of the present invention, the system displays an indication that the power-state of a device and/or the system has been changed. For instance, the indication can include one or more of the following: a light; a colored and/or flashing light; a sound; an alphanumeric text display; and/or a display indicating the level of power reduction in progress. Such displays can be used to reduce user confusion, for instance when manual switches do not activate devices as expected during a DR request. Note that such displays may be included at one or more phase-cutting devices and/or phase-cut detectors.

Variations

In one embodiment of the present invention, the system conveys multiple bits of information to a device by performing one or more of the following operations: adjusting the number of phase-cut notches in the common power signal; adjusting the width of one or more phase-cut notches; adjusting the polarity of one or more phase-cut notches; and/or adjusting the edges affected by one or more phase-cut notches. For instance, the system can send multiple bits of data by inserting and detecting phase-cut notches in different edges of the power signal. Such enhanced data transfer options may increase system cost and complexity, but enable a richer set of options beyond indicating basic on/off and duration for a power-change request. For instance, such capabilities may allow multiple levels of dimming and/or load reduction, or enable non-DR uses such as zone-controlled lighting of large spaces or individually-controlled lighting in small spaces. Enhanced phase-cut detectors may: selectively respond to ranges of inputs; determine based on a priority setting whether action should be taken for a given request; and/or include a selector switch or memory that can be used to determine the action taken for a given detected request. Note that a phase-cut detector may also include multiple outputs that correspond to different phase-cut inputs.

In one embodiment of the present invention, a phase-cut detector is incorporated into a wireless transmitter that relays a request received from phase-cut signals to other receivers within a given environment. This wireless device may simply echo the signal received, or transmit a "smart" signal with additional information. For instance, a wireless leg at the end of a power line might be able to reach some devices that might not otherwise be reachable using a phase-cut notch, such as devices on the other side of a DC converter. Similarly, a hybrid solution could space a number of such wireless repeaters evenly along an electrical circuit (e.g., an alarm system, or emergency lighting circuit) to evenly cover a given environment. Such wireless devices may also be used to monitor load wattage and report the wattage reduction gained in response to a DR signal. Such a wireless device may also be located at a phase-cutting device to receive a requesting signal and trigger the generation of phase-cut notches.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using power-line phase-cut signaling to change energy usage for one or more devices sharing a common power signal, comprising:
   detecting a phase-cut notch in the common power signal at a first device, wherein an upstream device receives a request to change power usage, wherein in response to the request, the upstream device inserts the phase-cut notch into the common power signal, wherein the first device is located downstream from the inserted phase-cut notch; and
   triggering a power-state change in the first device in response to the phase-cut notch in the common power signal;
   wherein a second device is controlled by a first switch and the first device is controlled by a second switch;
   wherein the first switch and the second switch are downstream from the inserted phase-cut notch;
   wherein a phase-cut detector is located downstream from the first switch;
   wherein the phase-cut detector can trigger a power relay that interrupts power for the first device;
   wherein if the request is received when both the first switch and the second switch are on, the phase-cut detector detects the phase-cut notch and triggers the power relay to disable the first device; and
   wherein if the request is received when only one of the first switch or the second switch are on, the states of the first device and the second device are not changed.

2. The method of claim 1, wherein the request is a demand response request to reduce energy usage that is sent by one or more of the following:
   a utility company;
   an independent service operator;
   an energy aggregator; and/or
   an energy rate payer.

3. The method of claim 2,
   wherein the request persists throughout a time period during which reduced energy usage is requested;
   wherein the modified power signal is output continuously for the time period; and
   wherein sending the modified power signal continuously prevents a phase-cut notch detector from needing to maintain information relating to the status and/or duration of the demand response state.

4. The method of claim 1, wherein the method facilitates reducing energy usage while minimizing the additional wiring and modifications which need to be made between the point of modification of the common power signal and the one or more devices.

5. The method of claim 4, wherein the common power signal is modified:
   at an individual circuit breaker for the first device;
   following an individual circuit breaker for the first device; and/or
   before an individual circuit breaker for the first device at a location which covers more than one circuit breaker.

6. The method of claim 5,
   wherein modifying the common power signal involves using a phase-cutting device and a relay which are placed in parallel in the path of the common power signal;
   wherein the relay is activated when the request is received;
   wherein a deactivated relay short-circuits the phase-cutting device, thereby bypasses the phase-cutting device and preventing the phase-cut notch from being inserted into the power signal;
   wherein an activated relay does not short-circuit the phase-cutting device, thereby allowing the phase-cutting device to insert the phase-cut notch into the common power signal; and
   wherein bypassing the phase-cutting device reduces power wastage in the phase-cutting device in the absence of a request to change power usage.

7. The method of claim 6, wherein the phase-cutting device is a triode for alternating current (TRIAC).

8. The method of claim 1, wherein one or more low-voltage field-effect transistors (FETs) are used to insert the phase-cut notch.

9. The method of claim 1,
   wherein a capacitor filters the phase-cut energy corresponding to the sharp voltage change of the phase-cut notch; and
   wherein the capacitor filters the phase-cut notch even when the phase-cut notch is not at a zero-crossing of an alternating-current power signal.

10. The method of claim 9,
    wherein a bridge rectifier downstream from the capacitor generates a unipolar power signal; and
    wherein a second capacitor downstream from the bridge rectifier is used to trigger the power-state change in one or more devices.

11. The method of claim 10,
    wherein the power relay is actuated using captured energy stored by the second capacitor that actuates the power relay for the full phase of the alternating-current power signal;
    wherein a resistor reduces the voltage across the second capacitor and the bridge rectifier when no phase-cut notch is present; and
    wherein a Zener diode is used to limit the maximum voltage across the power relay and/or the second capacitor.

12. The method of claim 1, wherein the phase-cut notch can be one or more of the following:
    a phase-cut in a leading edge of the power signal;
    a phase-cut in a trailing edge of the power signal;
    a phase-cut in a positive and/or negative edge of the power signal;
    phase-cuts in multiple edges of the power signal;
    single-polarity phase-cuts in one or more edges of the power signal;
    single-width phase cuts in one or more edges of the power signal; and/or
    multiple-width phase cuts in one or more edges of the power signal.

13. The method of claim 12, further comprising conveying multiple bits of information to the first device by one or more of the following techniques:

adjusting the number of phase-cut notches in the common power signal;
adjusting the width of one or more phase-cut notches;
adjusting the polarity of one or more phase-cut notches; and/or
adjusting the edges affected by one or more phase-cut notches.

14. The method of claim 1, wherein the detection of the phase-cut notch in the common power signal occurs in one or more of the following:
a detection device built into a power-controlled device;
a detection device external to a power-controlled device;
a detection device built into a light switch;
a detection device built into an electrical outlet, wherein one or more sockets in the electrical outlet are switched when a phase-cut notch is detected; and/or
a detection device plugged into a socket of an electrical outlet, wherein one or more sockets in the detection device are switched when a phase-cut notch is detected.

15. The method of claim 14, wherein triggering the power-state change in one or more devices can involve one or more of the following:
sending a signal to a device being controlled;
dimming a light;
turning a device on or off;
changing the speed of a multi-speed device;
reducing a load for a device;
changing a thermostat set point;
changing a clock speed for a computing device;
prompting a device to go into an energy-saving mode;
changing a time-out for an occupancy sensor;
performing a scheduling change for a device; and/or
turning off a non-critical device.

16. The method of claim 14,
wherein receiving the request and/or triggering the power-state change in one or more devices involves displaying an indication that energy usage is being changed; and
wherein the indication can include one or more of the following:
a light;
a colored and/or flashing light;
a sound;
an alphanumeric text display; and/or
a display indicating the level of power reduction in progress.

17. The method of claim 1, wherein inserting a phase-cut notch involves selecting a phase-cut notch size that can be detected but does not interfere with the operation of and/or damage the first device.

18. A method for using power-line phase-cut signaling to change energy usage for one or more devices sharing a common power signal, comprising:
receiving a request to change power usage; and
in response to the request, inserting a phase-cut notch into the common power signal;
wherein the phase-cut notch triggers a power-state change in one or more downstream devices;
wherein modifying the common power signal involves using a phase-cutting device and a relay which are placed in parallel in the path of the common power signal;
wherein the relay is activated when the request is received;
wherein a deactivated relay short-circuits the phase-cutting device, thereby bypassing the phase-cutting device and preventing the phase-cut notch from being inserted into the power signal;
wherein an activated relay does not short-circuit the phase-cutting device, thereby allowing the phase-cutting device to insert the phase-cut notch into the common power signal; and
wherein bypassing the phase-cutting device reduces power wastage in the phase-cutting device in the absence of a request to change power usage.

19. A method for using power-line phase-cut signaling to change energy usage for one or more devices sharing a common power signal, comprising:
detecting a phase-cut notch in a common power signal at a first device which is located downstream from a third device which inserts the phase-cut notch into the common power signal when the third device receives a request to change power usage; and
triggering a power-state change in the first device in response to the phase-cut notch in the common power signal;
wherein the first device and a second device are part of a demand-response lighting system;
wherein the second device is controlled by a first switch and the first device is controlled by a second switch;
wherein the first switch and the second switch are downstream from the inserted phase-cut notch;
wherein a phase-cut detector is located downstream from the first switch;
wherein the phase-cut detector can trigger a power relay that interrupts power for the first device;
wherein if the request is received when both the first switch and the second switch are on, the phase-cut detector detects the phase-cut notch and triggers the power relay to disable the first device; and
wherein if the request is received when only one of the first switch or the second switch are on, the states of the first device and the second device are not changed.

20. An apparatus that facilitates using power-line phase-cut signaling to change energy usage for one or more devices sharing a common power signal, comprising:
a receiving mechanism configured to receive a request to change power usage; and
an inserting mechanism configured to respond to the request by inserting a phase-cut notch into the common power signal, thereby triggering a power-state change in one or more downstream devices;
wherein modifying the common power signal involves using a phase-cutting device and a relay which are placed in parallel in the path of the common power signal;
wherein the relay is activated when the request is received;
wherein a deactivated relay short-circuits the phase-cutting device, thereby bypassing the phase-cutting device and preventing the phase-cut notch from being inserted into the power signal;
wherein an activated relay does not short-circuit the phase-cutting device, thereby allowing the phase-cutting device to insert the phase-cut notch into the common power signal; and
wherein bypassing the phase-cutting device reduces power wastage in the phase-cutting device in the absence of a request to change power usage.

21. An apparatus that facilitates using power-line phase-cut signaling to change energy usage for one or more devices sharing a common power signal, comprising:
a detecting mechanism configured to detect a phase-cut notch in the common power signal at a first device which is located downstream from a third device which inserts the phase-cut notch into the common power signal when the third device receives a request to change power usage;

wherein the first device and a second device are part of a demand-response system;

wherein the second device is controlled by a first switch and the first device is controlled by a second switch;

wherein the first switch and the second switch are downstream from the inserted phase-cut notch;

wherein the detecting mechanism is located downstream from the first switch;

wherein the detecting mechanism is further configured to trigger a power relay that interrupts power for the first device when it detects the phase-cut notch in the common power signal;

wherein if the request is received when both the first switch and the second switch are on, the phase-cut detector detects the phase-cut notch and triggers the power relay to disable the first device; and wherein if the request is received when only one of the first switch or the second switch are on, the states of the first device and the second device are not changed.

* * * * *